UNITED STATES PATENT OFFICE.

HERMANN WIEGAND, OF DANVILLE, ILLINOIS, ASSIGNOR OF ONE-HALF TO DANIEL W. VOORHEES, OF SAME PLACE.

MANUFACTURE OF STARCH.

SPECIFICATION forming part of Letters Patent No. 392,389, dated November 6, 1888.

Application filed May 4, 1888. Serial No. 272,798. (No specimens.)

*To all whom it may concern:*

Be it known that I, HERMANN WIEGAND, of Danville, in the county of Vermilion and State of Illinois, have invented a new and useful Improvement in the Manufacture of Starch, of which the following is a full, clear, and exact description.

The object of my invention will be best explained by the following prefacing remarks:
Gloss starch of commerce in the United States of America is generally a corn-starch dried in large crystals or lumps, of a widely-varying chemical composition. As most of it is prepared by what is termed the "chemical process"—that is, by the use of caustic alkali—the starch itself contains more or less free alkali or carbonate along with certain foreign substances which the alkali failed to separate, or which it extracts from the hull of the grain, or is formed by dissolving or decomposing some of the nitrogenous compounds and other constituents of the grain not starch. During the protracted period of drying the starch, which is necessary to produce a large crystal or lump, it is the presence of this alkali which prevents the deterioration of the moist starch in a room with very sparse ventilation heated to a temperature ordinarily varying from 100° to 150° Fahrenheit, as a pure moist starch or a starch containing germs of fermentation—such as is produced by the sour or rotting or non-chemical process—cannot be subjected to the conditions necessary to produce a large crystal or lump without spoiling or molding and consequent discoloration.

To make lump starch out of starch of any composition or by whatever process produced, it is necessary to protect it against the action of living organisms, which are ever present and cannot successfully be kept out. Alkali in considerable quantities will do this; but such is not always desirable to use, as it is too costly and requires considerable skill in the use of it, inasmuch as an excess is detrimental to the starch and unfits it for use in many ways, besides always carrying impurities incidental to the use of the starch with the alkali—especially coloring-matter. To the same end I have used antiseptics of different kinds, both organic and mineral, and these have been successful; but most of them have some one or more objectionable features, especially great cost and their changing the chemical character of the starch, which they necessarily do from their very nature. To overcome these several difficulties, I use an agent or agents that have no pronounced chemical reaction or character and which are entirely eliminated, or nearly so, during the process of drying, but still have great preserving powers for the moist starch and are very cheap and easily procurable. These agents are the volatile hydrocarbons of the aromatic and coal-oil series, preferably refined petroleum or the coal-oils of commerce.

To carry out my invention, I add to the liquid starch just before the molding or final settling process a small amount of refined coal-oil or other hydrocarbon of like character, or a mixture thereof, which may have the same mean boiling-point as water, or the boiling-point may be considerably lower for the lighter kinds and higher for the heavier hydrocarbons, if they only evaporate at the temperature of the drying-room. Such hydrocarbon agent may be mixed directly with the liquid starch by agitation, as I have found that liquid starch will take up and retain such substances although immiscible with water, and will not allow them to separate while the starch is settling. By way of example, I would state that of the common refined coal-oil of commerce, of, say, from 110° to 150° fire-test, about one-fifth to one-half per centum of the weight of dry starch may be used according to the nature of the starch; but as a larger quantity will not injure the starch in any way these proportions may be exceeded considerably, if necessary. If desired, the hydrocarbon may be first incorporated into or with a suitable amount of dry starch, and this latter then be added to the liquid starch. After the addition of the hydrocarbon the starch is settled or molded in the usual or any suitable way. Such starch will not ferment while wet and will not mold or discolor by the formation of fungi during the drying process, while the hydrocarbon will evaporate and be eliminated along with the vapors of water during the drying process without changing the chemical reaction or character of the starch. The drying-temperature used and the time consumed in drying may be varied.

Having thus described my invention, what I claim as new, and desire to secure by Letters Patent, is—

1. The herein-described improvement in the process of manufacturing starch, which consists in incorporating into liquid starch a volatile hydrocarbon or hydrocarbons, then molding the starch, and finally drying the starch, substantially as set forth.

2. The herein-described improvement in the process of manufacturing starch, which consists in incorporating into liquid starch a volatile hydrocarbon or hydrocarbons through the medium of a vehicle, then molding, and finally drying, the starch, substantially as set forth.

HERMANN WIEGAND.

Witnesses:
B. F. LEACH,
CHAS. N. HEAD.